(12) United States Patent
Danto et al.

(10) Patent No.: US 7,970,619 B2
(45) Date of Patent: Jun. 28, 2011

(54) SYSTEM AND METHOD FOR DETERMINING A WEIGHT OF AN ARRIVING AIRCRAFT

(75) Inventors: Evan J. Danto, Scottsdale, AZ (US); Louis Cinello, Tampa, FL (US); Matthew Stringer, Rochester, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 233 days.

(21) Appl. No.: 12/176,846

(22) Filed: Jul. 21, 2008

(65) Prior Publication Data

US 2010/0036669 A1 Feb. 11, 2010

Related U.S. Application Data

(60) Provisional application No. 60/951,034, filed on Jul. 20, 2007.

(51) Int. Cl.
*G06F 17/00* (2006.01)

(52) U.S. Cl. .................. 705/1.1; 705/400; 705/13

(58) Field of Classification Search .................. 705/400, 705/1.1, 13
See application file for complete search history.

(56) References Cited

U.S. PATENT DOCUMENTS

| 4,163,283 | A * | 7/1979 | Darby ............................ 701/120 |
| 6,384,783 | B1 * | 5/2002 | Smith et al. .................... 342/387 |
| 6,448,929 | B1 * | 9/2002 | Smith et al. .................... 342/456 |
| 6,812,890 | B2 * | 11/2004 | Smith et al. .................... 342/454 |
| 7,248,219 | B2 * | 7/2007 | Smith et al. .................... 342/456 |
| 7,437,250 | B2 * | 10/2008 | Breen et al. ..................... 702/34 |
| 7,612,716 | B2 * | 11/2009 | Smith et al. .................... 342/454 |
| 2007/0120729 | A1 * | 5/2007 | Barry et al. ...................... 342/33 |

* cited by examiner

*Primary Examiner* — Shannon S Saliard
(74) *Attorney, Agent, or Firm* — Fay Kaplun & Marcin, LLP

(57) ABSTRACT

A method for receiving data for an aircraft landing at an airport, the data including an aircraft type and one of an owner and an operator of the aircraft, the data excluding a unique identifier for the aircraft, retrieving additional data related to the aircraft based on the data, the additional data including a landing weight and reporting the landing weight and the landing to an airport operator.

12 Claims, 3 Drawing Sheets

| Aircraft Type | Operator | Default Weight |
|---|---|---|
| Boeing 757 | American Airlines | 205,500 lbs |
| Boeing 757 | Delta Airlines | 202,000 lbs |
| Boeing 757 | Generic | 197,000 lbs |
| Airbus A300 | British Airways | 265,750 lbs |
| Airbus A300 | Virgin Atlantic | 244,500 lbs |
| Airbus A300 | Generic | 257,000 lbs |
| Embraer E-175 | Air Canada | 68,000 lbs |
| Embraer E-175 | JetBlue Airways | 72,250 lbs |
| Embraer E-175 | Generic | 69,500 lbs |

FIG. 3

SYSTEM AND METHOD FOR DETERMINING A WEIGHT OF AN ARRIVING AIRCRAFT

PRIORITY CLAIM/INCORPORATION BY REFERENCE

This application claims the benefit of U.S. Provisional Patent Application 60/951,034, filed on Jul. 20, 2007, and entitled "System and Method for Determining a Weight of an Arriving Aircraft," which is expressly incorporated herein, in its entirety, by reference.

BACKGROUND

Airports generally charge a landing fee for every aircraft that lands at the airport. Generally, the fee is based on the weight of the landing aircraft (e.g., for every 1,000 pounds, a fee of $xx.xx is charged). Airports may monitor landing aircraft in a variety of manners. For example, the airport may have access to each airline's schedule and may make a determination of the number and type of planes that the airline has landed on that basis. However, since not every landing is scheduled and some landing planes do not appear on a schedule (e.g., chartered flights, private aircraft, etc.). Further, the flight schedule may not include information on the type of aircraft that is scheduled to fly, meaning that an accurate landing weight cannot necessarily be determined simply by consulting the flight schedule.

SUMMARY OF THE INVENTION

A method for receiving data for an aircraft landing at an airport, the data including an aircraft type and one of an owner and an operator of the aircraft, the data excluding a unique identifier for the aircraft, retrieving additional data related to the aircraft based on the data, the additional data including a landing weight and reporting the landing weight and the landing to an airport operator.

A system having a data receiving arrangement receiving landing aircraft data corresponding to an aircraft landing at an airport, the landing aircraft data excluding a unique identifier for the landing aircraft, a data storage arrangement storing a plurality of landing weights corresponding to aircraft data for a plurality of aircraft, the aircraft data excluding unique aircraft identifiers and a data processing arrangement receiving the landing aircraft data from the data receiving arrangement, retrieving one of the plurality of landing weights corresponding to the landing aircraft data, and reporting the retrieved one of the plurality of landing weights to a user.

BRIEF DESCRIPTION OF THE DRAWINGS

FIG. 3 shows an exemplary table including exemplary entries for determining a weight of an arriving aircraft according to the present invention.

DETAILED DESCRIPTION

Figure 1:
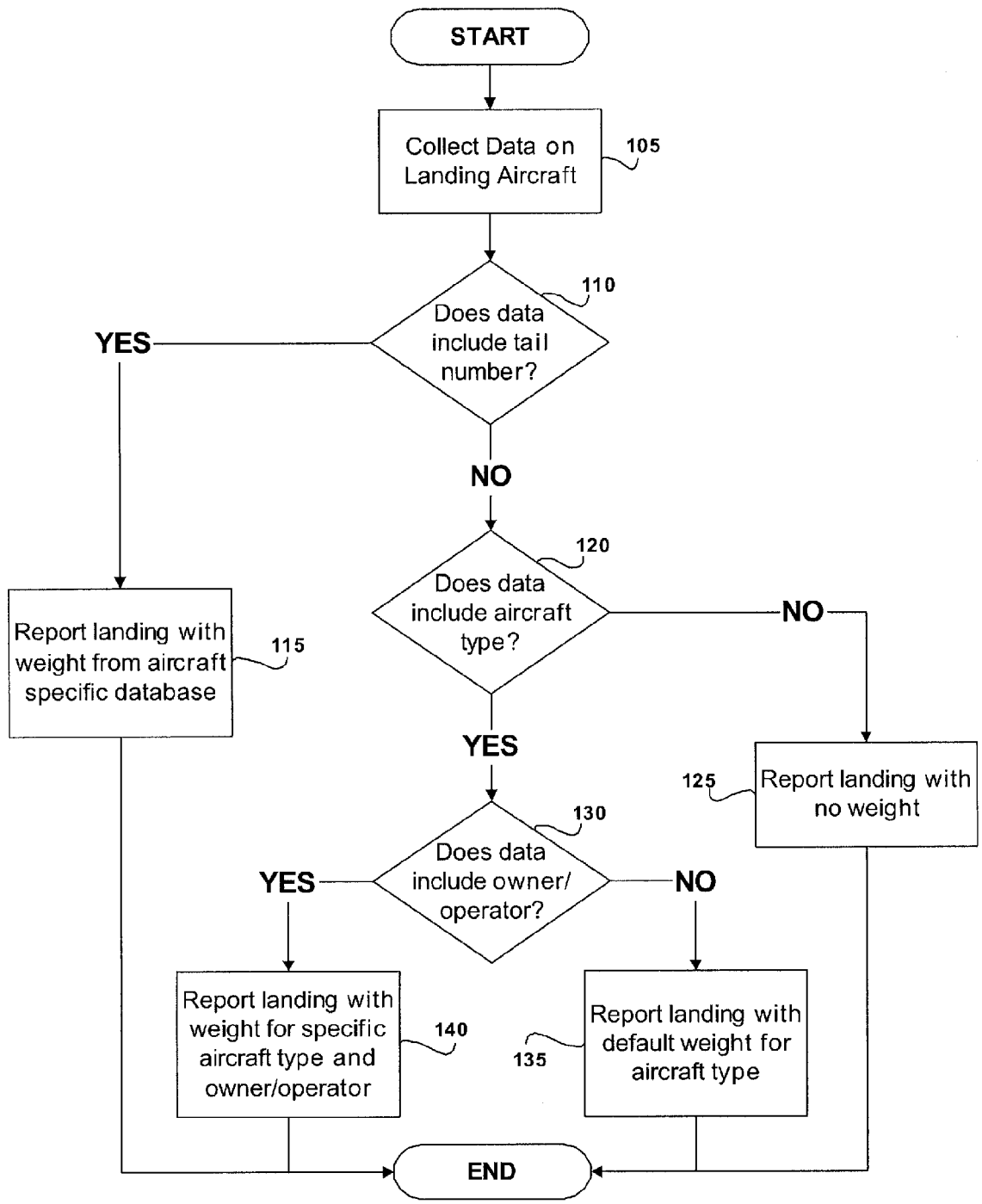
FIG. 1 shows an exemplary method for determining a weight of an arriving aircraft according to the present invention.

The exemplary embodiments of the present invention may be further understood with reference to the following description and the appended drawings, wherein like elements are referred to with the same reference numerals. The exemplary embodiments describe systems and methods for determining the weight of an arriving aircraft.

Existing methods for determining an accurate landing weight of an arriving aircraft suffer from a number of shortcomings. This information is necessary in order to determine landing fees charged by the airport. Airports may extract this information from published schedules of airlines. However, these schedules may not always include information about the type of aircraft that is scheduled to fly. Further, many flights (e.g., private aircraft, chartered aircraft, unscheduled landings) do not appear on any airline schedule. Therefore, a more accurate manner of determining weight (and, thus, landing fees) is desirable.

One method of addressing the issue described above involves the determination of which aircraft have actually landed at the airport. One way this determination may be made is through the use of data collected by a passive radar installation for the airport. In one exemplary embodiment, such a passive radar installation may be the PASSUR® System installed by PASSUR Aerospace, Inc. of Greenwich, Conn. Data collected and analyzed by the passive radar system may be used to identify each aircraft that lands at a particular airport. Those skilled in the art will understand that the data collected by the passive radar system may include actual data points collected from the aircraft by the passive radar hardware, as well as other data that may be retrieved from other sources such as stored databases or other data collection sources (e.g., active radar installations, FAA data feeds, etc.). It should be noted that while the exemplary embodiment is described with reference to data collection by a passive radar system, the present invention is not limited to passive radar systems. The collection of data for an arriving aircraft may be performed in any manner.

If a passive radar system collects data that includes a unique identifier for the aircraft (e.g., the tail number), the system may retrieve data about the aircraft from one or more databases. This data may include the weight of the aircraft, and may be sent to an airport operations department to indicate that an aircraft has landed at the airport, along with the weight of the aircraft for the purpose of billing the appropriate landing fee. Alternatively, if the passive radar does not identify the tail number, the specific information for the particular aircraft cannot be retrieved. In such a case, the system may only consult a generic data source (e.g., a database) including weight information for a specific type of aircraft. For example, the system may determine that the aircraft is a Boeing 757 aircraft and the data source may include a default weight for a generic Boeing 757 aircraft. The system may then insert the default weight as the landing weight to be reported to the airport.

However, different airlines may configure the same type of aircraft in different manners (e.g., first class/no first class, different numbers of rows of seats, etc.), resulting in different weights for aircraft of the same type. As a result, the insertion of a default weight for an aircraft class, rather than the weight of the particular aircraft, may result in the undercharging or overcharging of landing fees. To remedy this, in an exemplary embodiment of the present invention, a data source will include airline (or other entity) aircraft type information including the weight for a particular configuration. For example, a United Airlines Boeing 757 aircraft may have a first default weight, and a Continental Airlines Boeing 757 aircraft may have a second default weight that is greater or less than the first default weight. Thus, if the system does not identify the tail number, from which exact aircraft information may be determined, the data source of the present invention may be used to more accurately insert a default weight for the aircraft based on the information that is collected for the aircraft (e.g., aircraft type, airline, etc.).

FIG. 1 shows an exemplary method 100 for reporting landing weight to an airport operator. The method 100 may involve the various elements of the system 200, described below. In step 105, data is collected on a landing aircraft, e.g., by a passive radar system as described above. In step 110, it is determined whether the collected data includes the tail number of the aircraft. (In other embodiments of the present invention, a different unique aircraft identifier may be used in place of the tail number.) If the data includes the tail number, the process continues in step 115, in which the system may retrieve the weight of the aircraft from an aircraft-specific database and report the landing weight to the operator of the airport where the aircraft has landed.

Alternately, if the data does not include the tail number, the process continues in step 120, where it is determined if the data includes an aircraft type (e.g., Boeing 757, Airbus A320, etc.). If the data does not include an aircraft type, the process continues to step 125, where the aircraft landing is reported to the airport operator, but no weight is reported because it cannot be provided based on the collected data. If the data includes an aircraft type, the process continues in step 130, where it is determined if the owner/operator (e.g., an airline) is included in the data.

If the owner/operator data is not included in the available data, the process continues in step 135, where the system retrieves weight data from a database storing default weights based on aircraft types, and subsequently reports the landing and the default weight to the airport operator. If the owner/operator data is included in the collected data, the method continues in step 140, where the system retrieves the weight of the aircraft from a database that includes specific weights for the configurations of aircraft types for the particular owner/operator. Subsequently, the landing of the aircraft, together with the more accurate weight retrieved in this step, is reported to the airport operator.

Figure 2:
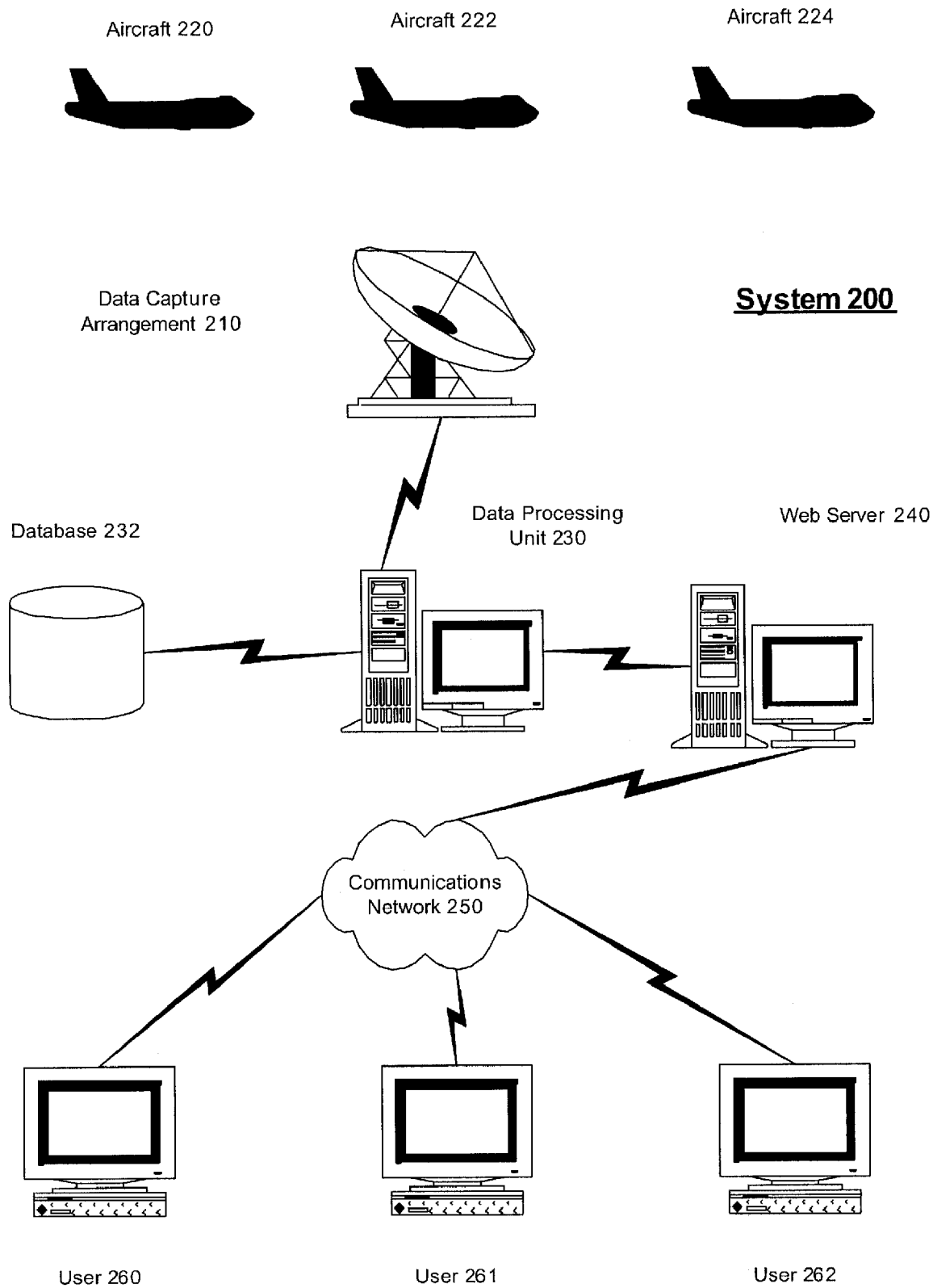
FIG. 2 shows an exemplary system for determining a weight of an arriving aircraft according to the present invention.

FIG. 2 illustrates an exemplary system 200 for performing the exemplary method 100 described above. A data capture arrangement 210 (e.g., a passive radar arrangement as described above) collects data including, but not limited to, data about landing aircraft 220, 222 and 224 as described above. The data about landing aircraft 220, 222 and 224 is received from the data capture arrangement 210 by the data processing unit 230, which retrieves corresponding weight data from the database 232 in the manner described above. The data processing unit 230 may be, for example, a standard PC-based server system running an operating system such as LINUX. Those skilled in the art will understand that any computing platform may be used for the processing unit 230. Those of skill in the art will understand that the database 232 may be any suitable method for storing weight data in a manner that may be accessible by the data processing unit 230. Further, while FIG. 2 illustrates a system 200 including a single database 232, in other embodiments, various types of data (e.g., data retrieved in step 115, data retrieved in step 135, data retrieved in step 140) may be stored in different databases. The database 232 may be internal to the processing unit 230 or may be a separate component located locally or remotely.

The system 200 further includes a web server 240 for serving content to users 260, 261 and 262, which may typically be airport operations centers as described above. Content is provided via a communications network 250 (e.g., the Internet) and includes, but is not limited to, the data retrieved by the exemplary method 100 described above. While the exemplary system 200 describes a web server 240 for providing content in, for example, a format accessible to users via a web browser or similar application, those of skill in the art will understand that other means of providing content to users are possible in other exemplary embodiments.

FIG. 3 illustrates an exemplary database 232 as described above with reference to the system 200 for use with the method 100. The database illustrated in FIG. 3 contains both default aircraft type weights for use in step 135 of the method 100, and owner/operator-specific aircraft type weights for use in step 140. Those of skill in the art will understand that these two types of weights may be stored in separate databases in other embodiments.

The database 232 includes a first data type 310 corresponding to various aircraft types. Those of skill in the art will understand that the specific types of aircraft illustrated in FIG. 3 are only exemplary and that many more types may be included in other embodiments. The database 232 further includes a second data type 320 corresponding to various owner/operators. As above, those of skill in the art will understand that the particular owner/operators listed are only exemplary. FIG. 3 illustrates a database 232 in which the second data type 320 includes the category "generic" for storing default aircraft type weights as retrieved in step 135 of the method 100; other exemplary databases may lack this classification, storing this data elsewhere. The database 232 further includes a third data type 330 corresponding to landing weights. While FIG. 3 illustrates landing weights indicated in pounds, other measures of weight or mass are possible.

The database 232 is broken into a plurality of entries 340-348, each of which contains one item of each of the data types 310, 320 and 330, and thus indicates a landing weight to be retrieved for a given input pair of aircraft type and owner/operator. As above, those of skill in the art will understand that the specific illustrated entries 340-348 are only exemplary and do not indicate actual landing weights for the illustrated aircraft and owner/operators. Further, those of skill in the art will understand that implementations of the present invention may incorporate databases 232 with significantly more entries than shown in FIG. 3.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A computer readable storage medium including a set of instructions executable by a processor, the set of instructions operable to:

receive data for an aircraft landing at an airport, the data including an aircraft type and one of an owner and an operator of the aircraft, the data excluding a unique identifier for the aircraft;

retrieve additional data related to the aircraft based on the data, the additional data including a landing weight; and report the landing weight and the landing to an airport operator, wherein, if the data includes the aircraft type and excludes the owner, the landing weight that is retrieved is a generic weight based only on the aircraft type, and wherein, if the data includes the aircraft type and the owner, the landing weight that is retrieved is a weight for the aircraft type specific to the owner.

2. The computer readable storage medium according to claim 1, wherein the set of instructions are further operable to:

collect the data for the aircraft landing at the airport.

3. The computer readable storage medium according to claim 1, wherein the set of instructions are further operable to:
calculate a landing fee based on the landing weight; and
report the landing fee to the airport operator.

4. The computer readable storage medium according to claim 1, wherein the data is received from a passive radar system.

5. The computer readable storage medium according to claim 1, wherein the data is received for a plurality of landing aircraft and the retrieving and reporting is performed for each of the landing aircraft.

6. The computer readable storage medium according to claim 1, wherein the set of instructions are further operable to:
receive further data for a further aircraft landing at an airport, the data including a unique identifier of the further aircraft;
retrieve further additional data related to the further aircraft based on the unique identifier, the further additional data including a further landing weight; and
report the further landing weight and the landing to an airport operator.

7. A system, comprising:
a data receiving arrangement receiving landing aircraft data corresponding to an aircraft landing at an airport, the landing aircraft data excluding a unique identifier for the landing aircraft;
a database storing a plurality of landing weights corresponding to aircraft data for a plurality of aircraft, the aircraft data excluding unique aircraft identifiers; and
a data processor receiving the landing aircraft data from the data receiving arrangement, retrieving one of the plurality of landing weights corresponding to the landing aircraft data, and reporting the retrieved one of the plurality of landing weights to a user,
wherein, if the landing aircraft data includes an aircraft type and excludes an owner, the landing weight that is retrieved is a generic weight based only on the aircraft type, and
wherein, if the landing aircraft data includes an aircraft type and an owner, the landing weight that is retrieved is a weight for the aircraft type specific to the owner.

8. The system according to claim 7, further comprising:
a data collection arrangement collecting the landing aircraft data.

9. The system according to claim 8, wherein the data collection arrangement is a passive radar system.

10. The system according to claim 7, wherein the data processor further calculates a landing fee based on the landing weight and reports the landing fee to the user.

11. The system according to claim 7, wherein the landing aircraft data is received for a plurality of landing aircraft and the data processor retrieves and reports the landing weight for each of the landing aircraft.

12. The system according to claim 7, wherein the data receiving arrangement receives further data for a further aircraft landing at an airport, the data including a unique identifier of the further aircraft, the data processor retrieving further additional data related to the further aircraft based on the unique identifier, the further additional data including a further landing weight and reporting the further landing weight and the landing to an airport operator.

* * * * *